May 16, 1967   F. PEHOUSHEK   3,320,441
ELECTRICAL CONTROL CIRCUITS FOR BOREHOLE APPARATUS
Filed Dec. 4, 1963   7 Sheets-Sheet 1

Fred Pehoushek
INVENTOR.

BY E. L. Archambeau Jr.

ATTORNEY

Fred Pehoushek
INVENTOR.

Fig. 7C

RESET OPERATION ON FAILURE TO SETDOWN
BEFORE SWITCH 31 CLOSES

Fig. 8

Fred Pehoushek
INVENTOR.

BY E. R. Archambeau Jr.
ATTORNEY

May 16, 1967      F. PEHOUSHEK      3,320,441
ELECTRICAL CONTROL CIRCUITS FOR BOREHOLE APPARATUS
Filed Dec. 4, 1963      7 Sheets-Sheet 7

Fig. 9

Fred Pehoushek
INVENTOR.

BY
ATTORNEY

United States Patent Office 3,320,441
Patented May 16, 1967

3,320,441
ELECTRICAL CONTROL CIRCUITS FOR
BOREHOLE APPARATUS
Fred Pehoushek, Houston, Tex., assignor, by mesne assignments, to Schlumberger Technology Corporation, Houston, Tex., a corporation of Texas
Filed Dec. 4, 1963, Ser. No. 328,072
6 Claims. (Cl. 307—112)

This invention relates to electrical control circuits and more particularly to circuits for controlling the operation of electrical instruments within a well tool.

It is common practice to pass tools containing electrical instruments through a well bore to obtain data relating to the fluid content and geological nature of the subterranean earth formations traversed by the well bore as well as to measure such variables as the bore diameter, vertical inclination or deviation of the well bore. These wellbore tools are typically suspended and passed through a well bore by use of an armored electrical cable spooled to a winch at the earth's surface. This cable provides an electrical communication path for transmitting power and signals between surface-located equipment and electrical instruments carried in the well-bore tool. It has heretofore been necessary to depend upon electrical conductors within such armored electrical cables to provide a control path from the ground surface to the instruments. As the number of downhole electrical components increases, however, it becomes more difficult to transmit a large number of control or power signals since the number of cable conductors is limited.

In another instance, logging instruments have been attached to the end of a string of pipe so that electrical conductors to the instruments from the surface are not practical.

It is, therefore, an object of the present invention to provide new and improved electrical control circuits for downhole control of electrical well-bore instruments.

It is a further object of the invention to provide new and improved control circuits which are activated by engaging an actuator on the well-bore tool with the well bore and manipulating it relative to the well bore.

It is an additional object of the invention to provide new and improved control circuits for downhole instruments which do not require a control path from the surface of the ground to the instrument.

It is another object of the invention to provide new and improved control circiuts for well-bore instruments which are activated only by predetermined and deliberate manipulations of the well tool and will not be activated by accidental contacts of the tool with the well bore.

These and other objects of the present invention are obtained by apparatus which includes a downhole switch operable by the physical manipulation of a well tool within the well bore.

The downhole switch includes a plunger associated with a momentary-contact electrical switch, the plunger being retained in an inoperative position by a resilient biasing means. The plunger, when brought into engagement with the bottom of the well bore or a bridge plug, is impelled by the weight of the well tool or force through a string of tubing to actuate the momentary-contact switch.

The present invention comprises an assembly of relays, and a cam-operated switch controlled by a timing motor, all of which are operatively connected to the plunger-actuated electrical switch. These components are arranged and connected so that the plunger-actuated switch must be actuated and deactuated in a predetermined and timed sequence respective to the alternate actuations and deactuations of the cam-operated switch which is regularly opened and closed by a cam drivingly connected to the timing motor. Operating the plunger-actuated switch in this predetermined sequence will sequentially close relays within the circuit to establish a circuit path or channel which connects a power supply carried within the well tool to the electrically-operated instruments within the tool. The circuits are further arranged so that either failure of the plunger-actuated switch to be open at certain times or failure of the plunger-actuated switch to be closed at certain times will reset the circuit relays thus requiring that the predetermined sequence be repeated.

Additional objects and advantages of the invention will become apparent from the following detailed description of representative embodiments thereof, taken in conjunction with the accompanying drawings, in which.

Figures 1, 10:
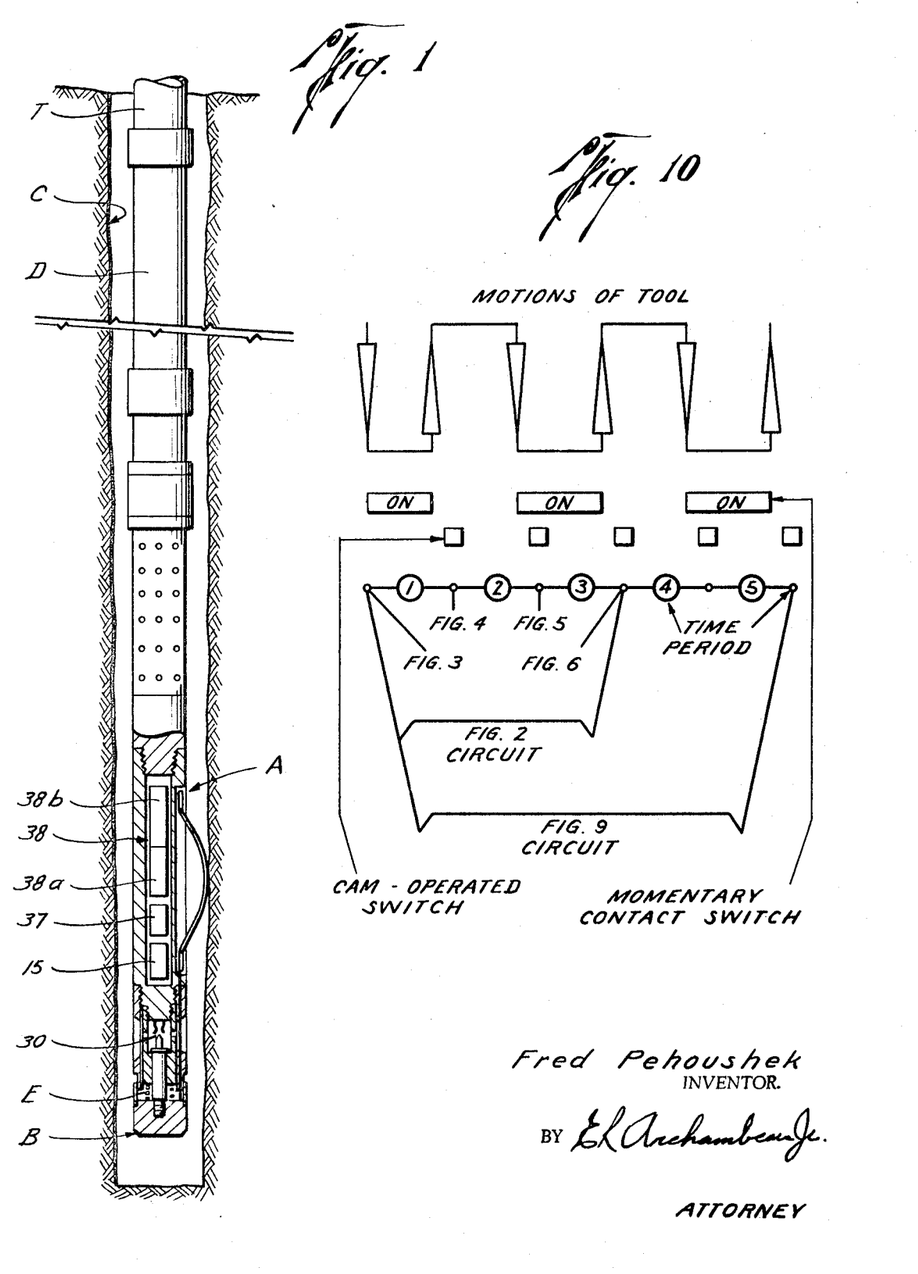
FIG. 1 illustrates a well tool equipped with a downhole switch, electrical instruments, a power supply and the novel control circuit.
FIG. 10 is a schematic representation of the operational sequence on a time-base scale.

In FIG. 1, a well bore tool A is illustrated as suspended at the lower end of a string of tubing T in a well bore C although such a tool could also be suspended by an armored electrical cable. Tool A includes a bottom bore-contacting member B adapted to engage the bottom of the well bore C. Contacting member B is reciprocally mounted in the tool A and controls the operation of a momentary-contact switch 30. Switch 30, in turn, is a part of switching and controlling means 15, the switching and controlling means 15 serving to control the connection of a power source 37 to electrical instruments 38. Instrument 38 may, for example, be circuitry associated with a resistiivty measuring device 38a and recording instruments 38b such that electrical resistivity can be measured downhole and recorded within the tool downhole.

Figure 2:
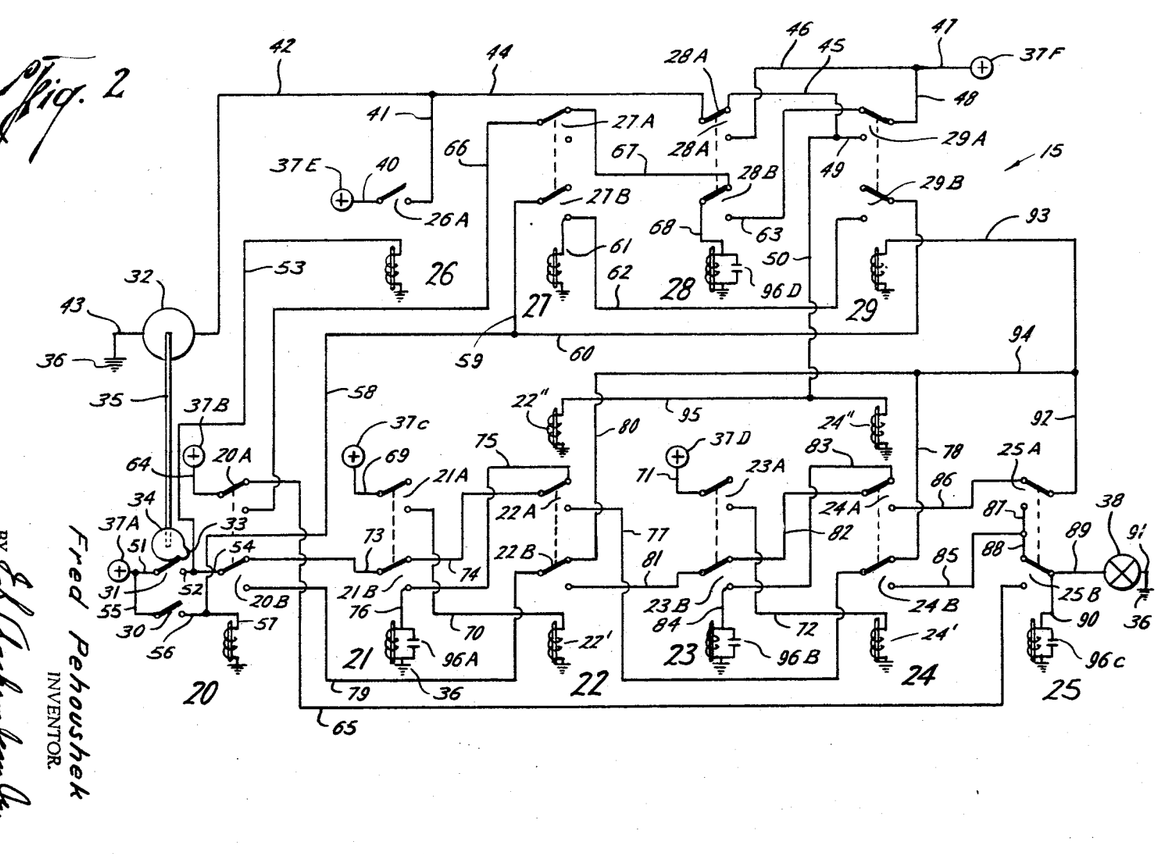
FIG. 2 shows one embodiment of a control circuit employing the principles of the present invention.

Referring now to FIG. 2, it will be seen that the switching and controlling means 15 includes a series of relays 20–29, the plunger-actuated momentary-contact switch 30, a cam-operated switch 31, and a timer motor 32.

Timer motor 32 actuates cam-operated switch 31 in a predetermined and regular manner by means of a cam 33 on a cam disc 34 driven by motor shaft 35. Thus, it will be appreciated that when timer motor 32 is running, each time cam disc 34 makes a revolution, cam-operated switch 31 will be closed for a brief interval whenever cam 33 engages the actuator of switch 31. Although it is preferred that timer motor 32 make one revolution in a relatively short period, such as one minute, it will be apreciated that this period may be either shorter or longer as dictated by the particular situation.

Relays 20–29 may be any type of conventional direct-current relays, but preferably are sub-miniature units capable of withstanding high shock, high vibrations and high ambient temperatures. As seen in FIG. 2, with the exception of relay 26, all relays are of the double-pole double-throw type. It is preferred, however, for the sake of uniform physical configuration to use a double-pole double-throw relay for relay 26 as well without utilizing one section thereof.

Relays 22 and 24 are magnetic latching relays with dual coils. Upon application of power thereto, coils 22' and 24' of relays 22, 24, respectively, actuate or close relay switches 22A–22B and 24A–24B, in which position the switches are firmly latched or locked without requiring further application of power to maintain that position. Upon application of power thereto, reset coils 22" and 24" of relays 22, 24, respectively, will actuate or open relay switches 22A–22B and 24A–24B, and move the relay switches to the open position (the position shown in FIG. 2) in which position they remain latched or locked without requiring further application of power to reset coils 22" and 24". These relay switches will remain latched open until such time that power is again applied to coils 22' and 24' and reset coils 22" and 24" are no longer energized. Thus, it will be appreciated that relays 22, 24 provide means for latching or locking their respective relay switches into a first position and reset means for actuating these switches and moving them into a second position where they are again latched or locked.

The other relays, 20, 21, 23 and 25–29, are permanent-magnet relays that pull their relay switches closed whenever their respective coil is energized. These relays, of course, stay closed only so long as their respective coil is energized.

All relay coils and the timer motor are connected at one end thereof to a common return, shown at 36, which may be either a common bus-bar or a chassis return. A power source 37 supplies voltage to the circuit. For the sake of clarity, the power source is illustrated at several points 37A–37F to simplify the circuit diagrams, but it is to be understood that it is immaterial whether a single power source or several are used.

The electrical instruments within the well tool are schematically represented at 38 of the circuit diagrams. It will be appreciated that these instruments can be any instrument or combination of instruments requiring electrical power that can be or are used within a well tool.

A conductor 40 connects power source 37E to relay switch 26A. From relay switch 26A, a conductor 41 leads and is joined to conductor 42 which is connected to timer motor 32. The other side of timer motor 32 is connected to the common return 36 by a conductor 43. From the junction of conductors 41, 42 conductor 44 is connected to the common or moving contact of relay switch 28A. The normally-closed contact of relay switch 28A is connected to conductor 45. The normally-open contact of relay switch 28A is connected to conductor 46 which joins conductor 47 which is connected to power source 37F. Conductor 48 leads from the junction of conductors 46, 47 to the common or moving contact of relay switch 29A. The normally-open contact of relay switch 29A is connected by conductor 49 to a junction of conductors 45 and 50.

Power source 37A is conected by conductor 51 to one side of cam-operated switch 31 with the other side of the switch being connected to conductor 52. Conductor 52 is joined to conductors 53, 54, with conductor 53 leading to the coil of relay 26 and conductor 54 leading to the common or moving contact of channel selector or relay switch 20B.

Power source 37A is connected by conductor 55 to one side of momentary-contact switch 30 with the other side of the switch being connected to conductor 56 which in turn is connected to conductor 57 connected to the coil of relay 20. From the junction of conductors 56, 57, conductor 58 joins conductor 59 which is connected to the common or moving contact of relay switch 27B.

From the junction of conductors 58, 59, conductor 60 is connected to the common or moving contact of relay switch 29B. The normally-closed contacts of relay switches 27B and 29B are not used; but a conductor 61 connects the normally-open contact of relay switch 27B to the coil of relay 27, and a conductor 62 connects this same contact to the normally-open contact of relay switch 29B.

The normally-closed contact of relay switch 29A is connected by conductor 63 to the normally-open contact of relay switch 28B.

Power source 37B is connected by conductor 64 to the common or moving contact of relay switch 20A, with conductors 65, 66 connected to the normally-closed and normally-open contacts, respectively, of that relay switch. Conductor 65, the third or operating channel, is in turn connected to the normally-open contact of relay switch 25B, while conductor 66 is connected to the common or moving contact of relay switch 27A.

The normally-open contact of relay switch 27A is not used, but conductor 67 connects that relay switch's normally-closed contact to the normally-closed contact of relay switch 28B. Conductor 68 connects the common or moving contact of relay switch 28B to the coil of that relay.

Power source 37C is connected by conductor 69 to the common or moving contact of relay switch 21A. The normally-closed contact of this relay switch is not used, but conductor 67 connects that relay switch's the relay coil 22' of latching relay 22 by conductor 70. Similarly, power source 37D is connected to the common or moving contact of relay switch 23A by conductor 71. The normally-closed contact of this switch is not used. Conductor 72 is connected from the normally-open contact of relay switch 23A to the coil 24' of latching relay 24.

Turning now to the central portion of the novel circuit, first and second channels or electrical paths are provided in parallel with each other. These channels are so arranged that the first channel will be progressively established in response to actuations and deactuations of momentary-contact switch 30 in correctly-spaced intervals relative to the regular periodic actuations and deactuations of cam-operated switch 31. The second channel, as do those portions of the first channel which have not yet been connected into the first channel as it is progressively established, serves as a reset channel which will connect the channel selector or relay switch 20B to the reset switch 29B if the proper operating sequence of switches 30, 31 is not followed. The second channel serves also to provide a path to energize certain relays in the circuit.

The first channel begins with conductor 73 which interconnects the normally-closed contact of channel selector switch 20B with the common or moving contact of relay switch 21B. Conductor 74, the next portion of the first channel, interconnects the normally-closed contact of relay switch 21B to the common or moving contact of latching relay switch 22A with conductor 75 returning from the normally-closed contact of latching relay switch 22A to the normally-open contact of relay switch 21B; and from that contact, conductor 76 connects to the coil of relay 21.

Conductor 77, the third portion of the first channel, interconnects the normally-open contact of latching relay switch 22A to the common or moving contact of latching relay switch 24B. The normally-closed contact of latching relay switch 24B is connected to a reset path or conductor 78.

The first portion of the second channel is conductor 79 which interconnects the normally-open contact of channel selector relay switch 20B to the common or moving contact of latching relay switch 22B. A reset path or conductor 80 is connected from the normally-closed contact of latching relay switch 22B to a junction with the reset path or conductor 78.

The second portion of the second channel consists of conductor 81 which connects the normally-open contact of latching relay switch 22B to the common or moving contact of relay switch 23B. Conductor 82, representing the third portion of the second channel, is connected between the normally-closed contact of relay switch 23B and the common or moving contact of latching relay switch 24A. In a manner similar to conductors 75, 76, conductor 83 connects the normally-closed contact of latching relay switch 24A to the normally-open contact of relay switch 23B, and conductor 84 connects the latter contact to the coil of relay 23.

The fourth portion of the first channel is represented by conductor 85 which is connected to the normally-open contact of latching relay switch 24B. Conductor 86 constitutes the fourth and last portion of the second channel and is connected from the normally-open contact of latching relay switch 24A to the normally-closed contact of relay switch 25A.

Conductor 85 is joined to a junction of wires 87, 88, which are respectively connected to the normally-open contact of relay switch 25A and the normally-closed contact of relay switch 25B. Conductor 88 represents the fifth portion of the first channel. The final portion of the first channel, conductor 89, connects the electrical instrument 38 to the common or moving contact of relay switch 25B. Conductor 90 connects the last-named contact to the coil of relay 25 and conductor 91 connects the electrical instrument 38 to the return path or bus 36.

A reset path or conductor 92 is connected to the common or moving contact of relay switch 25A. The coil of relay 29 is connected by a conductor 93 to a junction with reset path or conductor 92; from which junction, conductor 94 is connected to the junction of relay paths or conductors 78, 80. Conductor 95 connects reset coils 22″, 24″ to conductor 50. Capacitors 96 are connected in parallel across the coils of relays 21, 23, 25 and 28 to ensure the closing of these relays as they are switched from one position to another and voltage is momentarily interrupted during the brief interval the common contact is being shifted.

OPERATION OF CIRCUIT

Briefly, the purpose of the switching and controlling circuit 15, as described above, is to require the performance of a predetermined series of positive manipulations of the well tool relative to the well bore to establish the first channel from the power source to the electrical instrument within the tool. Failure to perform these predetermined manipulations in the correct sequence or in the time allotted for each manipulation will result in the circuit being deactivated which will require beginning the sequence again. Furthermore, if for any reason it becomes necessary to halt the sequence, the circuit will automatically reset itself. Additionally, after the electrical instrument has been operating and it is desired to shut it off, it is necessary only to close the momentary-contact switch and either hold it closed for several minutes or immediately release it before the cam-operated switch has had time to close. Either action will cause the circuit to reset to its deactivated position. It will be appreciated also that accidental manipulations will not start the electrical instrument.

Assuming, for the sake of illustration only, that the timer motor 32 will make a complete revolution in one minute, the sequence will be as follows:

(1) *First setdown*

(a) The well tool A is lowered to where it rests on either the bottom of the borehole or on a previously-located bridge plug therein, this action operating switch 30.

(B) The tool A can be pulled up at any time after making contact, but in any event must be pulled up before the first one-minute period has elapsed.

(2) *First pickup*

(a) The well tool A is raised a sufficient distance to ensure that the bore-contacting member is free, switch 30 is then opened.

(b) The tool A can be pulled up at any time after period has elapsed and can be lowered at any time thereafter.

(c) Failure to pick up within the first one-minute period will reset the circuit.

(3) *Second setdown*

(a) The well tool A is again lowered to where it rests on either the bottom of the borehole or on a previously-located bridge plug therein, this action again operating switch 30.

(b) The tool must be engaged by the end of the second one-minute period but can be raised at any time after the second one-minute period has elapsed.

(c) Failure to set down before the end of the second one-minute period will reset the circuit.

(4) *Second pickup*

(a) The well tool is again raised a sufficient distance to ensure that the bore-contacting member is free and switch 30 again opened.

(b) The tool must not be disengaged before the second one-minute period has elapsed but can be picked up at any time thereafter before the third one-minute period has elapsed.

(c) Failure to disengage the tool within the third one-minute period will reset the circuit.

DESCRIPTION OF OPERATING SEQUENCES

For the sake of clarity, in the sequential operations illustrated by FIGS. 3–8, only those parts of the circuit which are involved in that particular operation are shown. The operative paths are represented by solid lines and the nonoperative paths are represented by dashed lines. Furthermore, to aid in illustrating the sequential operations, some relays are first shown as being energized but with their contacts still unswitched, with the subsequent figures showing the contacts switched. Reference should also be made to FIG. 10 which illustrates the overcall timing sequence relative to the following description.

FIRST SETDOWN AND STARTING SEQUENCE

When the circuit 15 is in the condition as shown in FIG. 2, the well-bore tool A illustrated in FIG. 1 is lowered until its bore-contacting member B engages either the bottom of the borehole or a bridge plug (not shown) set in a predetermined location in the borehole C. The well-bore tool acts to move bore-contacting member B inwardly and closes momentary-contact switch 30.

Figure 3A:
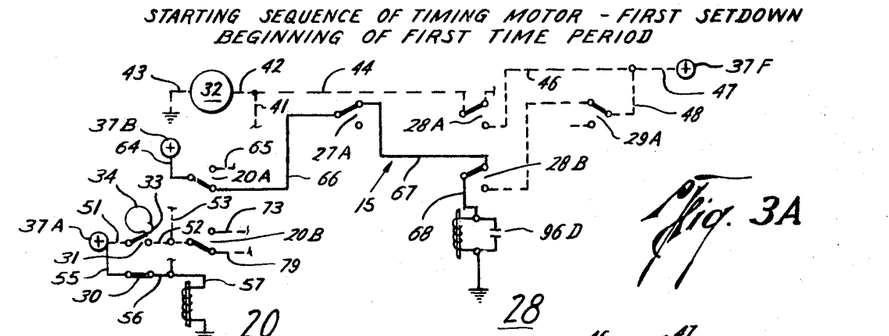
FIGS. 3A and 3B show the operating sequence at the beginning of the predetermined cycle.
Figure 3B:
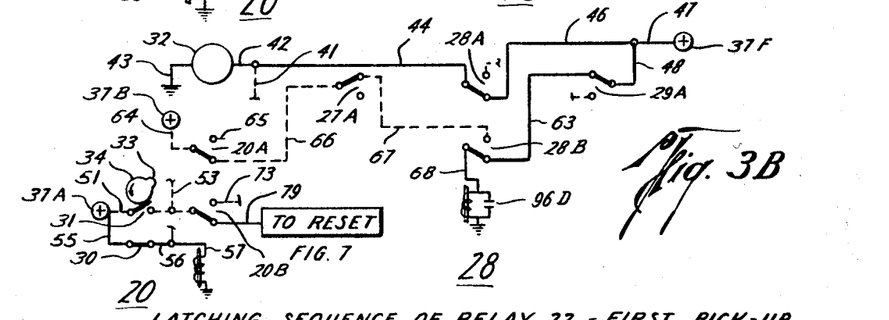

As illustrated in FIG. 3A, momentary-contact switch 30 has just been closed which energizes relay 20. Relay switch 20A is accordingly switched to complete a circuit from power source 37B through relay switch 27A and relay switch 28B to the coil of relay 28. It should be noted that only relay switches 20A–20B are closed at first and relay switches 28A–28B have not yet closed. As seen in FIG. 3B, however, both relay switches 28A–28B close an instant later. The capacitor 96D shunted across the coil of relay 28 is charged sufficiently to ensure that the relay will continue closing during the very short interval that the moving or common contacts are moving from the normally-closed contacts to the normally-open contacts of the relay switches.

Closing of relay switch 28B applies a holding voltage from power source 37F to the coil of relay 28 by way of relay switch 29A, conductor 63 and relay switch 28B. Closing of relay switch 28A completes a circuit from power source 37F to timing motor 32. This starts timing motor 32, and cam disc 34 now begins to rotate.

Since timing motor 43 will continue to run until the operating channel has been established between electrical instrument 38 and power source 37F or a misstep occurs in the operating sequence which resets the entire circuit, no further mention need be made of the operation of timing motor 32 until such time. It is accordingly to be understood that timing motor 32 continues to cyclically rotate cam disc 34 as the following operations take place.

Thus, it will be appreciated that the first setdown of the instrument starts the timing motor and completes a holding circuit thereto. As seen in FIG. 3B, cam 33 has now rotated from its "off" position shown in FIG. 3A and will close cam-operated switch 31 when it completes its first revolution and engages the actuator of switch 31.

It should be also noted that so long as momentary-contact switch 30 remains closed, relay 20 is energized which holds the movable contact of channel-selector relay switch 20D downwardly thereby completing a circuit from cam-operated switch 31 to conductor 79 which is the first portion of the second channel. Thus, at this point in the sequence, if momentary-contact switch 30 is not opened before cam 33 completes its first revolution and engages cam-operated switch 31, power will be supplied to conductor 79 and, as shown in FIG. 7, the circuit will reset which requires that the sequence be started again. In the proper predetermined sequence of operations, however, before cam-operated switch 31 closes, the well-bore tool A is picked up which opens momentary-contact switch 30 and de-energizes relay 20 so that channel-selector relay switch 20B is in its upper position ready for the next sequence of operations.

FIRST PICKUP

Figure 4A:
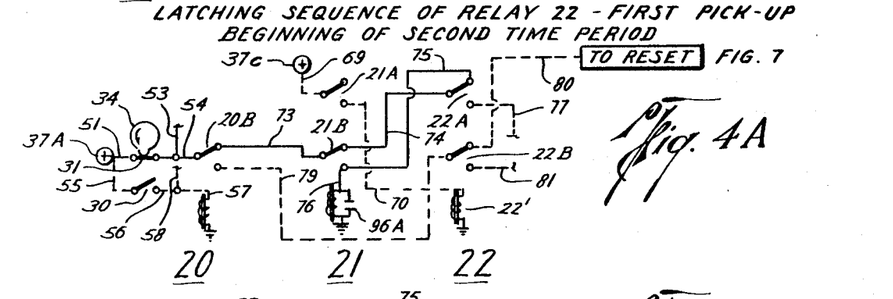
FIGS. 4A and 4B show the operating sequence at the next step of the predetermined cycle.

The circuit of FIG. 4A represents the arrangement of the circuit at the end of the first time period, at which time cam-operated switch 31 has just been closed by cam 33 and momentary-contact switch 30 has been opened at some earlier time.

Figure 4B:
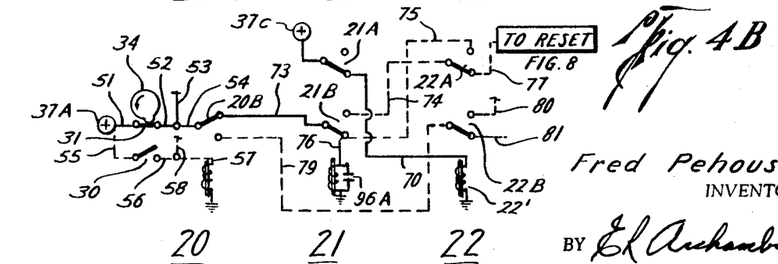

When cam-operated switch 31 closes, power is supplied through channel-selector relay switch 20B, relay switch 21B, and relay switch 22A to energize the coil of relay 21. In FIG. 4A, although relay 21 is now energized, relay switches 21A–21B have not yet closed. In FIG. 4B, however, with the aid of capacitor 96A, relay switches 21A–21B have just closed and a holding voltage from power source 37A is now applied through relay switch 21B to the coil of relay 21.

Power is now supplied from power source 37C through relay switch 21A to coil 22' of relay 22. Energizing of coil 22' pulls the movable contacts of latching relay switches 22A–22B downwardly where they are latched into place until such later time that voltage is applied to reset coil 22''.

Figure 8:
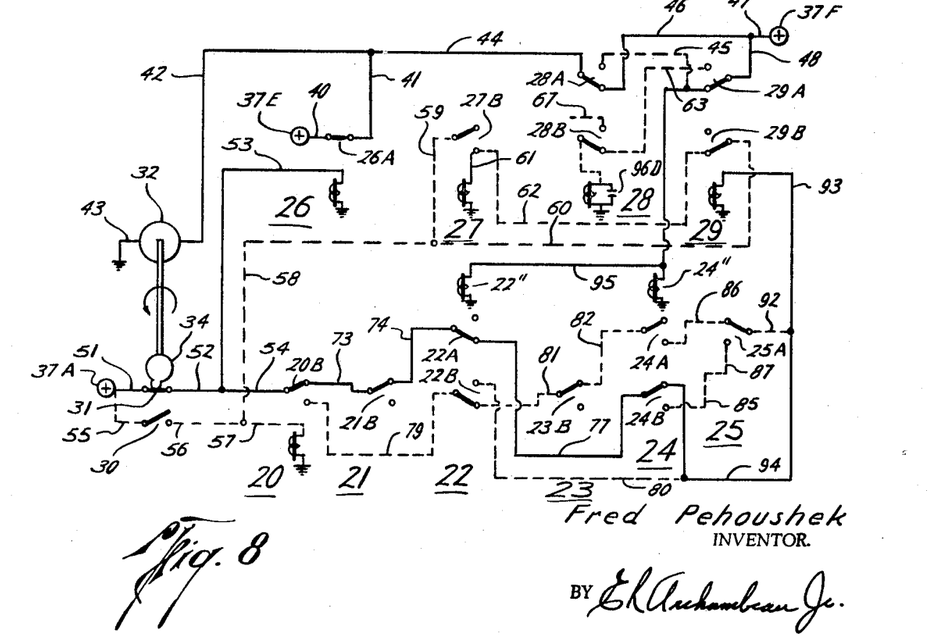
FIG. 8 shows the beginning sequence of reset operations which occur if the predetermined operating cycle is not correctly followed at another interval in the cycle of operations.

Closing of latching relay switch 22A now provides a possible path to the reset circuit by way of conductor 77 should a misstep be made later. It should be noted also that the holding voltage on the coil of relay 21 is now solely controlled by cam-operated switch 31 so that whenever cam 33 rotates out of engagement with switch 31, the switch will open to de-energize relay 21 and open relay switches 21A–21B. Thus, when relay switches 21A–21B open, if channel-selector relay switch 20B is not closed before cam 33 completes its second revolution, when cam 33 again closes cam-operated switch 31, voltage will be supplied from power source 37A to the reset circuit by way of conductor 73, relay switch 21B, conductor 74, latching relay switch 22A and conductor 77 and, as shown in FIG. 8, the circuit will be reset. In the proper sequence of operations, however, before cam 33 makes this second revolution, the well tool is set down which closes momentary-contact switch 30, energizes relay 20, and puts channel-selector relay switch in its lower position ready for the next sequence of operations.

SECOND SETDOWN

Assuming that the proper sequences have been followed and momentary-contact switch 30 is closed prior to the second revolution of cam 33, the latching sequence of latching relay 24 is initiated by the second setdown of the well tool A.

Figure 5A:
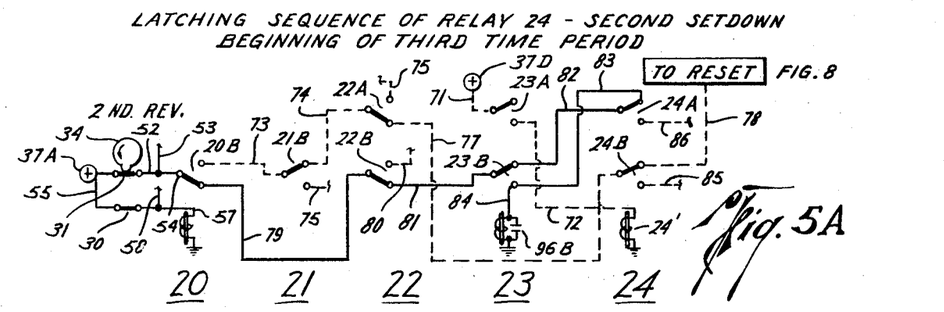
FIGS. 5A and 5B show the operating sequence at the subsequent step of the cycle.

As seen in FIG. 5A, cam 33 has now completed its second revolution and has just closed cam-operated switch 31 which supplies voltage from power source 37A through relay switch 20B, latching relay switch 22B, relay switch 23B, and latching relay switch 24A to the coil of relay 23. In FIG. 5A, although the coil of relay 23 is now energized, the relay switches 23A–23B have not yet closed.

Figure 5B:
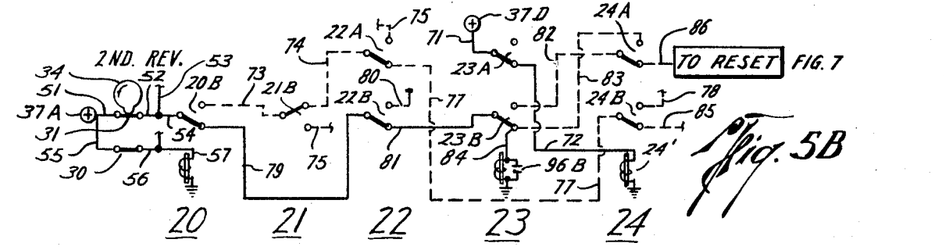

Closing of relay switches 23A–23B, as illustrated in FIG. 5B, supplies a holding voltage from power source 37A through relay switch 23B to the coil of relay 23. Closing relay switch 23A connects power source 37D to coil 24' of latching relay 24 which closes and latches relay switches 24A–24B.

As illustrated in FIG. 5B, at this point in the time sequence, latching relay switch 24A has been latched closed and is now connected to reset path 92 by way of conductor 86 and relay switch 25A. It will be appreciated that as soon as cam 33 rotates out of engagement with cam-actuated switch 31, relay 23 will be de-energized which will open relay switch 23B, thereby connecting conductor 81 to conductor 82. It will be clear, therefore, that if channel-selector relay switch 20B is not earlier opened by picking up the well tool A, when cam 33 completes its third revolution and again closes cam-operated switch 31, voltage from power source 37A will be supplied to the reset circuit by way of conductor 79, latching relay switch 22B, conductor 81, relay switch 23B and conductor 82 which will initiate a reset operation as illustrated in FIG. 7.

In the proper sequence of operations, however, the well tool will be picked up prior to the completion of the third cam revolution thereby switching channel-selector relay switch 20B to the correct position for the next sequence.

SECOND PICKUP

Figure 6A:
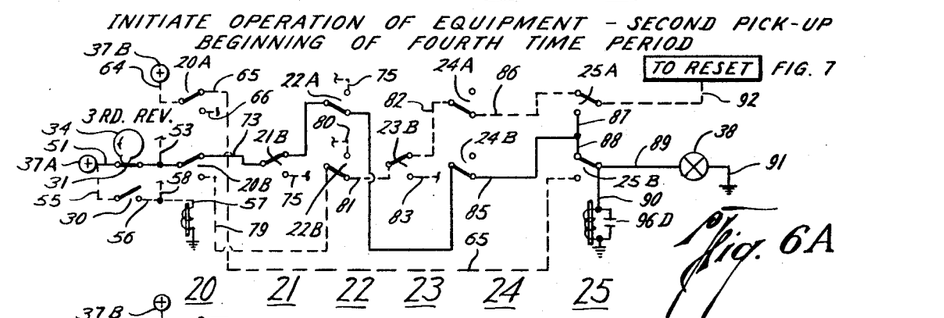
FIGS. 6A and 6B show the operating sequence in the final step of the cycle of operations.
Figure 6B:
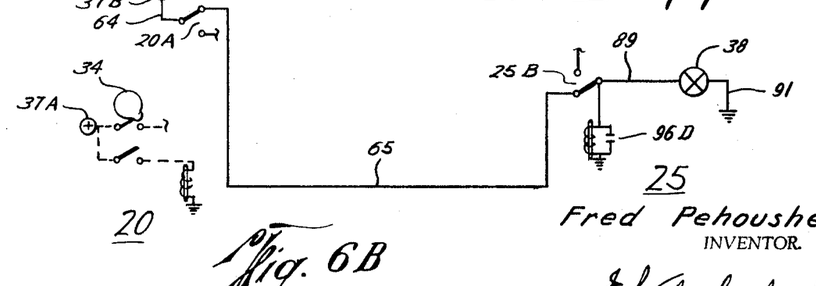

Assuming that switch 30 was earlier opened, when cam 33 completes its third revolution and closes switch 31, as illustrated in FIG. 6A, voltage is now supplied from power source 37A through the first channel by way of relay switches 20B, 21B, 22A, and 24B, conductors 85, 88 and on through relay switch 25B to conductor 89 and electrical instrument 38. Voltage is also simultaneously applied to the coil of relay 25 through conductor 90 to energize the relay. In FIG. 6A, the relay switches 25A–25B have not yet closed and, as seen in FIG. 6B, when these relay switches close, a continuous third path or operating channel is established from power source 37B through relay switch 20A, conductor 65, relay switch 25B and conductor 89 to electrical instrument 38 as well as apply a holding voltage to the coil of relay 25. As soon as cam 33 has been disengaged from switch 31, the circuit is reest as shown in FIG. 8, leaving only relay 25 energized to maintain the continuous path or operating channel from the power source 37B to the instrument 38. It will be noted in FIG. 6A that upon closing of relay switches 25A–25B, voltage will be supplied from power source 37A through conductors 85, 87 and relay switch 25A to reset path of conductor 92 which leads to the reset circuit.

DESCRIPTION OF RESET OPERATIONS

There are two possible errors which may occur during the normal operating sequence which will cause the circuit to be reset and restored to its deactivated state. One of these errors is the failure to pick up the well tool A before the end of either the first time period or the third time period. The second error is the failure to set down the well tool A before the end of the second time period. Each of the reset operations are very similar with only minor differences in their initial stages.

Figure 7A:
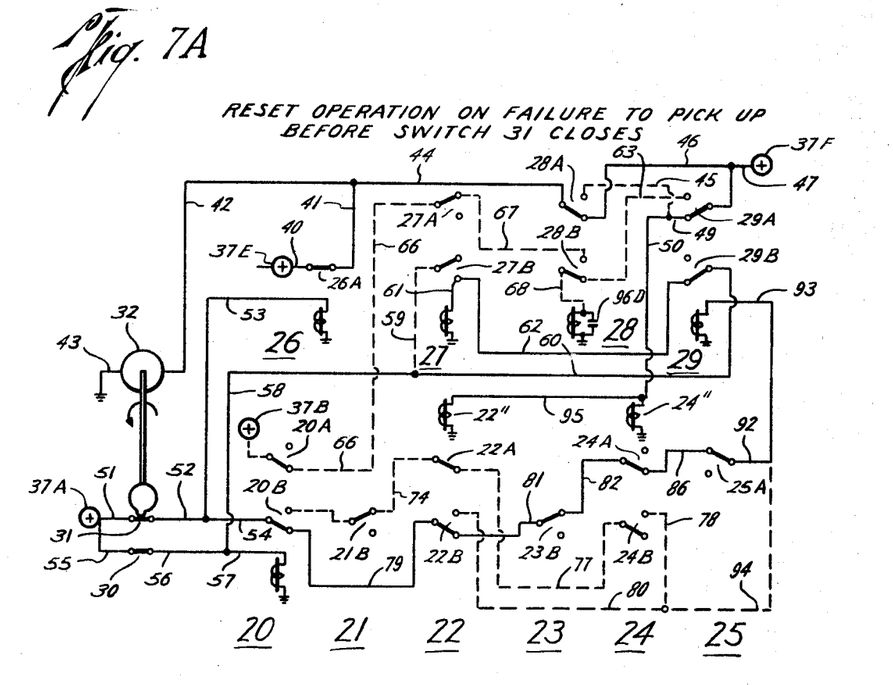
FIGS. 7A, 7B and 7C sequentially show the reset operations which occur if the predetermined operating cycle is not correctly followed.

In FIG. 7A, the reset operation which occurs upon failure to pick up the well tool A before the next subsequent closing of cam-operated switch 31 is illustrated. The sequential operations illustrated in FIGS. 7A, 7B and 7C occur whenever switch 30 is not opened soon enough, as for example, in the interval between the operations illustrated in FIG. 3B and FIG. 4A (during the first time period) or in the interval existing between the operations illustrated in FIG. 5B and FIG. 6A (during the third time period).

Assume that during the third time period (the interval existing between FIGS. 5B and 6A), the well tool A is not picked up soon enough and momentary-contact switch 30 is still closed when cam-operated switch 31 closes. As seen in FIG. 7A, at the instant switch 31 closes, voltage is supplied from power source 37A through switch 31, relay switches 20B, 22B, 23B, 24A and 25A to conductors 92, 93 to energize relay 29 and close relay switches 29A–29B. Closing of relay switch 29A de-energizes the coil of relay 28 for the first time since the initial starting operation (FIGS. 3A–3B) and energizes the reset coils 22″, 24″ of the two latching relays by way of conductor 50. Closing of relay switch 29B energizes the coil of relay 27 for the first time. As illustrated in FIG. 7A, however, these respective relay switches have not yet had time to move.

Figure 7B:
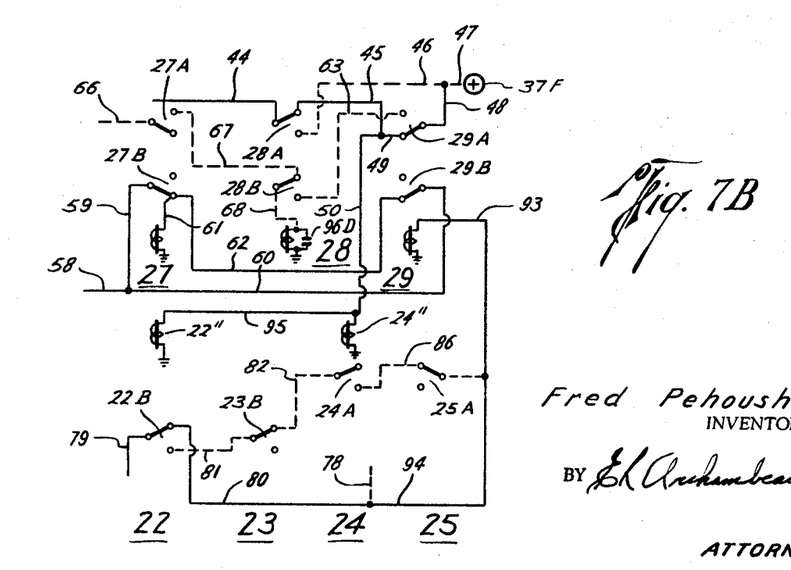

FIG. 7B shows the circuit after these relay switches have moved to their new positions. Relay switch 28A has now opened to connect conductor 44 to power source 37F by way of conductor 45 rather than conductor 46. Relay switch 28B has moved only from one de-energized conductor to another. Relay 27 is held energized to prevent a restarting operation by way of relay switch 27A as illustrated in FIG. 3A. The reset coils 22″ and 24″ have now unlatched and moved latching relays 22, 24 into their "up" position where they are again latched. When latching relay switches 22B, 24A open, the second channel is broken but voltage is still applied to the coil of relay 29 from power source 37A through relay switch 20B, conductor 79, relay switch 22B and conductors 80, 94 and 93. This voltage will be maintained until cam-operated switch 31 opens.

Figure 7C:
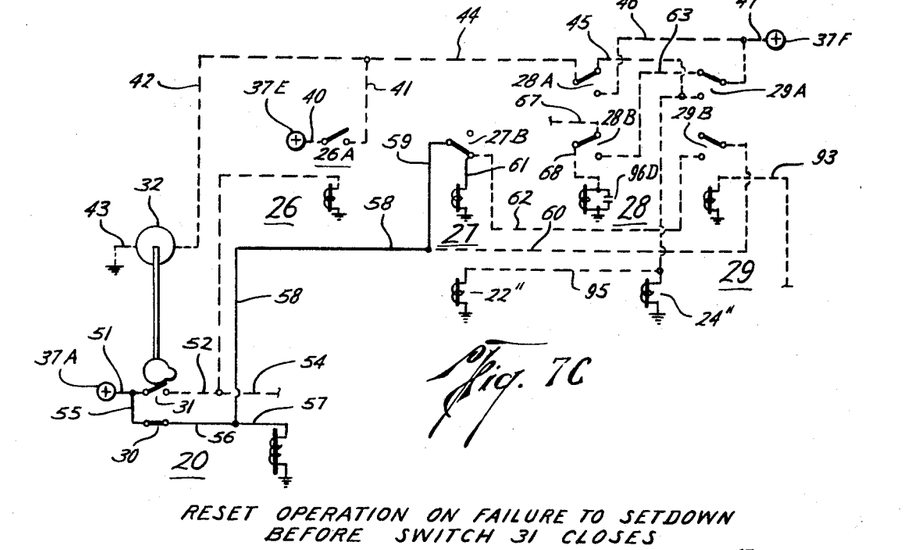

FIG. 7C shows the next step in the reset operation. Relay switches 29A–29B have now opened since the timing motor 32 has opened cam-operated switch 31. Relay 26 is controlled by cam-operated switch 31 so it will be appreciated also that when cam 33 rotated out of engagement with cam-operated switch 31, the opening of that switch opened relay switch 26A thereby turning-off motor 32 and de-energizing the reset coils 22″, 24″. Thus, when the tool is picked up, switch 30 will open to de-energize relay 27.

The above description of the reset operation of FIGS. 7A–C assumed that the tool A was not raised soon enough during the third time period. Substantially the same reset operation will take place, however, if the tool is not raised soon enough during the first time period.

Turning to FIG. 4A, which illustrates the circuit at the end of the first time period, it will be noted that if momentary-contact switch 30 were closed, relay switch 20B would be down to establish an operative path from power source 37A, relay switch 20B, conductor 79 and latching relay switch 22B to conductor 80. Thus, as seen in FIG. 7A, voltage would be supplied to the coil of relay 29 from conductor 80 rather than from conductor 92 as previously described in connection with FIG. 7A. With this single exception, the reset operation during the first time period will otherwise be the same as the above-described reset operation during the third time period.

In FIG. 8 is shown the beginning sequence of the reset operation which occurs upon failure to set down the well tool A before cam-operated switch 31 closes. This can occur during the second time period in the interval existing between the operations shown in FIG. 4B and FIG. 5A.

Referring to FIG. 4B, it will be noted that relay 21 is energized by voltage from power source 37A which is controlled by cam-operated switch 31. Thus, it will be appreciated that upon rotation of cam 33 out of engagement with cam-operated switch 31, the switch will open and de-energize the coil of relay 21. This will move relay switch 21B upwardly to connect conductor 73 to conductor 74. Latching relay switch 22A will remain in its downward position since it has been latched closed by previous operations as shown in FIG. 4A and FIG. 4B. Thus, should cam disc 34 make a complete revolution without momentary-contact switch 30 being previously closed, voltage will be supplied to the reset circuit by way of relay switches 20B, 21B and 22A. It is this particular situation that is illustrated in FIG. 8.

As seen in FIG. 8, cam 33 has made a complete revolution from the moment illustrated in FIG. 4B and has again engaged cam-operated switch 31. Voltage is supplied from power source 37A through the full-line path to energize relay 29 and close relay switches 29A–29B. Voltage is also supplied through conductor 53 to the coil of relay 26 to close relay switch 26A. Closing of relay switch 29A de-energizes the coil of relay 28, as well as energizes the reset coil 22″ of latching relay 22. In FIG. 8, relay switches 28A–28B and latching relay switch 22A have not yet transferred.

As soon as latching relay switch 22A opens, the reset circuit is broken (as shown by the full-line path through relay switch 22A) and relay 29 is de-energized. Relay switch 29A now opens and since relay switch 28B has already opened, the coil of relay 28 remains de-energized. The circuit is now de-energized except that the timing motor 32 will continue to run until relay 26 is de-energized which will occur as soon as cam-operated switch 31 opens. Opening of cam-operated switch 31 will de-energize relay 26 and open relay switch 26A to remove the voltage supplied to the timing motor 32 from power source 37E.

FIG. 8 also illustrates the final reset operation upon successful completion of the first channel through the relay circuit, as illustrated in FIG. 6A. The only difference between the circuit illustrated in FIG. 8 and the position of the circuit at this later time is that both latching relay switches 22A and 24B are latched closed by this time. This will not change the reset operation already described with reference to FIG. 8 except that the reset path will instead be from latching relay switch 24B, conductor 85, conductor 87, relay switch 25A and conductor 92. All other operations will remain the same.

ALTERNATE EMBODIMENT

Figure 9:
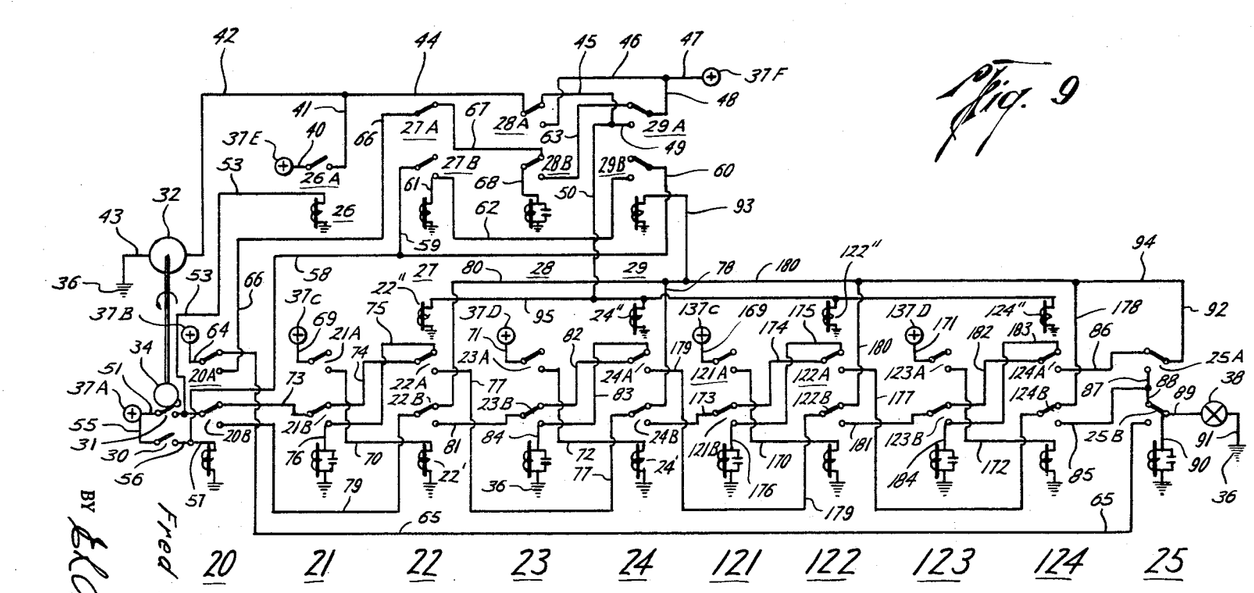
FIG. 9 shows an alternative embodiment of a circuit employing the principles of the present invention.

An alternate embodiment of a circuit employing the principles of the present invention is illustrated in FIG. 9.

This alternate circuit would be used in the event it was believed possible that the bore-contact member still might make successive engagements and disengagements in the right sequence to cause the circuit to be progressively set and prematurely supply power to instruments 38. For example, if the invention was being used to control the firing of a perforating gun, it would be prudent to use the circuit of FIG. 9 to provide an extra safety factor against premature detonation of the charges.

The circuit is illustrated with the same reference numerals used in FIG. 2 being used for the corresponding elements in FIG. 9, and the additional elements being indicated by adding 100 to the reference numerals of the equivalent elements. Thus, it will be appreciated that relays 121, 122, 123 and 124 are duplications of relays 21, 22, 23 and 24, and that they have equivalent functions in the expanded circuit. Comparision of FIG. 2 with FIG. 9 will show that relays 121, 122, 123 and 124 are interconnected in the same manner as relays 21, 22, 23 and 24. The duplicated sub-assembly is inserted between relays 24 and 25 with the normally-open contact of latching relay switch 24A being connected by conductor 179 to the common or moving contact of latching relay switch 122B. Latching relay switch 24B has its normally-closed contact connected to the reset path by conductor 178 and its normally-open contact connected by conductor 173 to the common or moving contact of relay switch 121B. Latching relay switch 124A has its normally-open contact connected to conductor 85 and latching relay switch 124B has its normally-open contact connected to conductor 85.

The operating sequence will be identical except that the second pickup will not finish establishing the first channel. The second pickup will instead close and latch latching relay 122 in the same manner that latching relay 22 is closed and latched (FIGS. 4A–4B). The third setdown will close and latch latching relay 124 in the same manner that latching relay 24 is closed and latched (FIGS. 5A–5B). Then, the third pickup will initiate operation of the electrical equipment in the same manner as illustrated in FIGS. 6A–6B.

Reset operations and the final operations will remain the same. It will be understood, of course, that additional reset paths, such as 178, 180 are provided as well as the natural lengthening of the first and second channels with the additional relay switches therein. The mechanics of the operations are still the same as those described in detail for the first embodiment.

Either of the circuits employing the concepts of the invention can be used to control the operation of any electrical instrument that might be used in a well tool. For example, a formation-logging instrument either with or without a recorder could be started and stopped with either of the novel circuits. If it were desired to use the circuits to control the firing of a perforating tool, a bridge plug would be set just below the lower end of the zone to be perforated. A perforating tool equipped with the inventive circuit would then be lowered to the zone and manipulated in accordance with the predetermined cycle. Thus, on the last pull-up of the tool, the firing circuit woud be completed and the charges detonated. If it were preferred to accurately orient the perforator before the actual firing, a conventional time-delay relay could be initiated upon completion of the first channel so that at some predetermined interval of time thereafter, the time-delay relay would close to actually complete the firing circuit.

Although the invention has been described in conjunction with a well tool suspended from a string of tubing, it should be understood that the principles of the invention could be used in other comparable embodiments. For example, the well tool could be suspended from an armored electrical cable without departing from the scope and spirit of the invention. Moreover, while mechanical switches have been described, it will be appreciated that the switches may be electrical transistors or the like which can be arranged to provide the desired switching function.

Thus, in the use of the invention, a well tool A equipped therewith is first lowered to a selected depth. Upon reaching the bottom of the well bore or a bridge plug within the well bore C, the bore-contacting member B is placed into contact therewith so that the weight of the instrument compresses the bore-contacting member against the biasing force of the compression spring E to close the momentary-contact switch 30 and initiate the subsequent operation of the instrument 38 within the tool. The borehole instrument would then be operated in its usual manner, and retrieved from the well bore when desired.

It will be appreciated, therefore, that the use of the control circuit with conventional borehole instruments will serve to eliminate the need for electrical conductors in a suspension cable or along a string of tubing for self-powered instruments, and will permit the instrument to be controlled from the ground surface by manipulating the instrument with respect to the borehole.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A downhole switching device for a well tool comprising: a housing including relatively movable members which can be moved between at least two positions; first and second circuit means in said housing, said first circuit means controlling the operation of second circuit means, said first circuit means including a first switch means; second switch means arranged for actuation in response to positioning of said members in one of said positions; means responsive to actuation of said second switch means for periodically actuating said first switch means in a predetermined timed sequence; channel means coupled to said first and second switch means and responsive to a predetermined time sequence of actuation of said first and second switch means for controlling the operation of said second circuit means, said channel means including parallel electrical paths; a third switch means for coupling one or the other of said paths to said first switch means, said third switch means being responsive to said second switch means; and reset switch means coupled to said electrical paths and responsive to changes from said predetermined timed sequence for deactuation of said periodically-actuated switch means.

2. A downhole switching device for a well tool adapted to be suspended within a borehole comprising: first switch means; first actuating means to periodically open and close said first switch means at predetermined spaced time intervals; second switch means; second actuating means to open and close said second switch means, said second actuating means being responsive to engagement with and to manipulation relative to the borehole; power source means, said first and second switch means being connected to said power source means; first and second electrical channel means; first switching means having an input connected to said first switch means, a first output connected to said first channel means and a second output connected to said second channel means; first energizing means for said first switching means for selectively connecting the input of said first switching means to one or the other of the outputs of said first switching means, said second switch means being connected to said first energizing means and so arranged that when said second switch means is open said input is connected to said first output and when said second switch means is closed said input is connected to said second output; second switching means having an input connected to said first electrical channel means and an output adapted for connection to a power-utilizing device; and second energizing means connected to said second electrical channel for selectively operating said second switching means and connecting the input of said second switching means to the output of said second switching means.

3. A downhole switching device for a well tool adapted to be suspended within a borehole comprising: first switch means periodically operable at predetermined spaced time intervals; second switch means responsive to engagement with and manipulation relative to the borehole; power source means, said first and second switch means being connected to said power source means; first and second electrical channel means; first switching means having an input connected to said first switch means, a first output connected to said first channel means and a second output connected to said second channel means; first energizing means for said first switching means for selectively connecting the input of said first switching means to one or the other of the outputs of said first switching means, said second switch means being connected to said first energizing means and so arranged that when said second switch means is open said input is connected to said first output and when said second switch means is closed said input is connected to said second output; second switching means having an input connected to said first electrical channel means and an output adapted for connection to a power-utilizing device; and second energizing means connected to said second electrical channel for selectively operating said second switching means and connecting the input of said second switching means to the output of said second switching means.

4. A downhole switching device for a well tool adapted to be suspended within a borehole comprising: a first switch; first actuating means to periodically open and close said first switch at predetermined spaced time intervals; a second switch; second actuating means to open and close said second switch, said second actuating means being responsive to engagement with and to manipulation relative to the borehole; a power source, said first and second switches being connected to said power source; first and second electrical channel means; first switching means having an input connected to said first switch, a first output connected to said first channel means and a second output connected to said second channel means; first energizing means for said first switching means for selectively connecting the input of said first switching means to one or the other of the outputs of said first switching means, said second switch being connected to said first energizing means and so arranged that when said second switch is open said input is connected to said first output and when said second switch is closed said input is connected to said second output; second switching means having an input connected to said first electrical channel means and an output adapted for connection to a power-utilizing device; second energizing means connected to said second electrical channel for selectively connecting the input of said second switching means to the output of said second switching means; means for locking the connection of said second switching means upon connection thereof; and reset means for unlocking and disconnecting said second switching means and deactivating said first actuating means, said reset means being responsive to actuation of said second actuating means at any time subsequent to locking of said second switching means 5. A downhole switching device for a well tool adapted to be suspended within a borehole comprising: a first switch; first actuating means to periodically open and close said first switch at predetermined spaced time intervals; a second switch; second actuating means to open and close said second switch, said second actuating means being responsive to engagement with and to manipulation relative to the borehole; a power source, said first and second switches being connected to said power source; first and second electrical channel means; first switching means having an input connected to said first switch, a first output connected to said first channel means and a second output connected to said second channel means; first energizing means for said first switching means for selectively connecting the input of said first switching means to one or the other of the outputs of said first switching means; said second switch being connected to said first energizing means and so arranged that when said second switch is open said input is connected to said first output and when said second switch is closed said input is connected to said second output; second switching means having an input connected to said first channel means and an output adapted for connection to a power-utilizing device; and second energizing means for said second switching means for selectively connecting the input of said second switching means to the output of said second switching means, said second energizing means being connected to said second channel means, said second switching means being arranged so that when said second energizing means connects the input to the output of said second switching means, a locked connection therebetween will be established, whereby actuation of said second switch will energize said first energizing means to connect the input of said first switching means to the second output of said first switching means and a first actuation of said first switch will connect said power source to said second energizing means to lockingly connect the input of said second switching means to the output of said second switching means so that after said second switch is deactuated, a second actuation of said first switch will complete a circuit betwen said power source and the output of said second switching means.

6. A downhole switching device for a well tool adapted to be suspended within a borehole comprising: a first switch; first actuating means to periodically open and close said first switch at predetermined spaced time intervals; a second switch; second actuating means to open and close said second switch, said second actuating means being responsive to engagement with and to manipulation relative to the borehole; a power source, said first and second switches being connected to said power source; first and second electrical channel means; first switching means having an input connected to said first switch, a first output connected to said first channel means and a second output connected to said second channel means; first energizing means for said first switching means for selectively connecting the input of said first switching means to one or the other of the outputs of said first switching means, said second switch being connected to said first energizing means and so arranged that when said second switch is open said input is connected to said first output and when said second switch is closed said input is connected to said second output; second switching means having an input connected to said first channel means and an output adapted for connection to a power-utilizing device; second energizing means for said second switching means for selectively connecting the input of said second switching means to the output of said second switching means, said second energizing means being connected to said second channel means, said second switching means being arranged so that when said second energizing means connects the input to the output of said second switching means, a locked connection therebetween will be estabestablished, whereby actuation of said second switch will energize said first energizing means to connect the input of said first switching means to the second output of said first switching means and a first actuation of said first switch will connect said power source to said second energizing means to lockingly connect the input of said second switching means to the output of said second switching means so that after said second swtich is deactuated, a second actuation of said first switch will complate a circuit between said power source and the output of said second switching means; means for locking the connection of said second switching means upon connection thereof; and reset means for unlocking and disconnecting said second switching means and deactivating said first actuating means, said reset means being responsive to actuation of said second actuating means at any time subsequent to locking of said second switching means.

References Cited by the Examiner

UNITED STATES PATENTS

| | | | |
|---|---|---|---|
| 1,882,892 | 10/1932 | Potts | 307—132 |
| 2,320,863 | 6/1943 | Green | 200—61.42 X |
| 2,331,229 | 10/1943 | Reagan | 307—112 |
| 2,968,747 | 1/1961 | Shillington | 317—139 |
| 3,215,867 | 11/1965 | Mellinger | 307—141 |
| 3,223,184 | 12/1965 | Jones et al. | 175—41 |
| 3,260,866 | 7/1966 | Martin | 307—141 |

ORIS L. RADER, *Primary Examiner.*

T. B. JOIKE, *Assistant Examiner.*